United States Patent Office 3,075,786
Patented Jan. 29, 1963

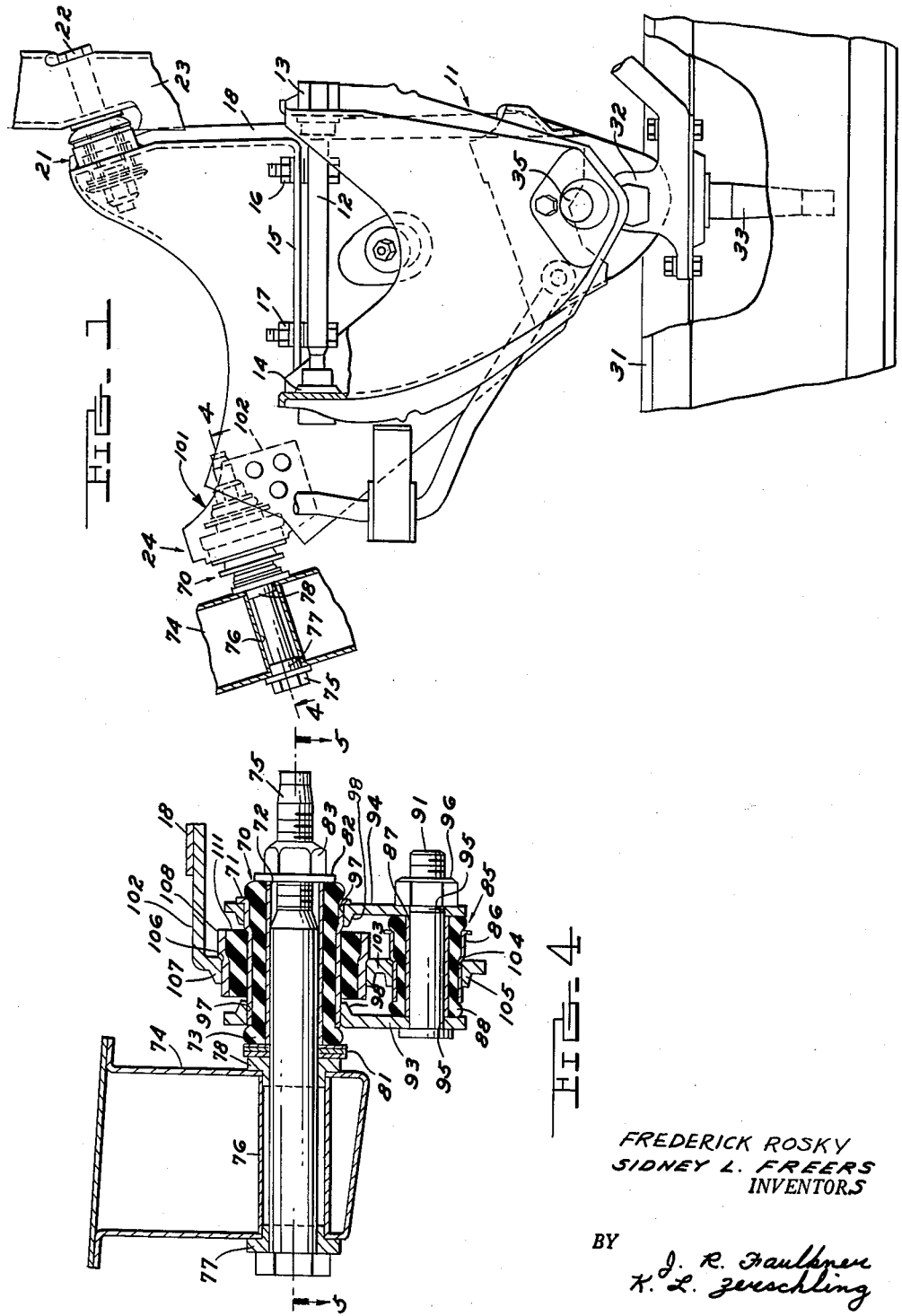
Jan. 29, 1963   S. L. FREERS ETAL   3,075,786
VEHICLE INDEPENDENT SUSPENSION SYSTEM
Filed Oct. 3, 1960   3 Sheets-Sheet 1
FREDERICK ROSKY
SIDNEY L. FREERS
INVENTORS
BY
J. R. Faulkner
K. L. Zwischling
ATTORNEYS

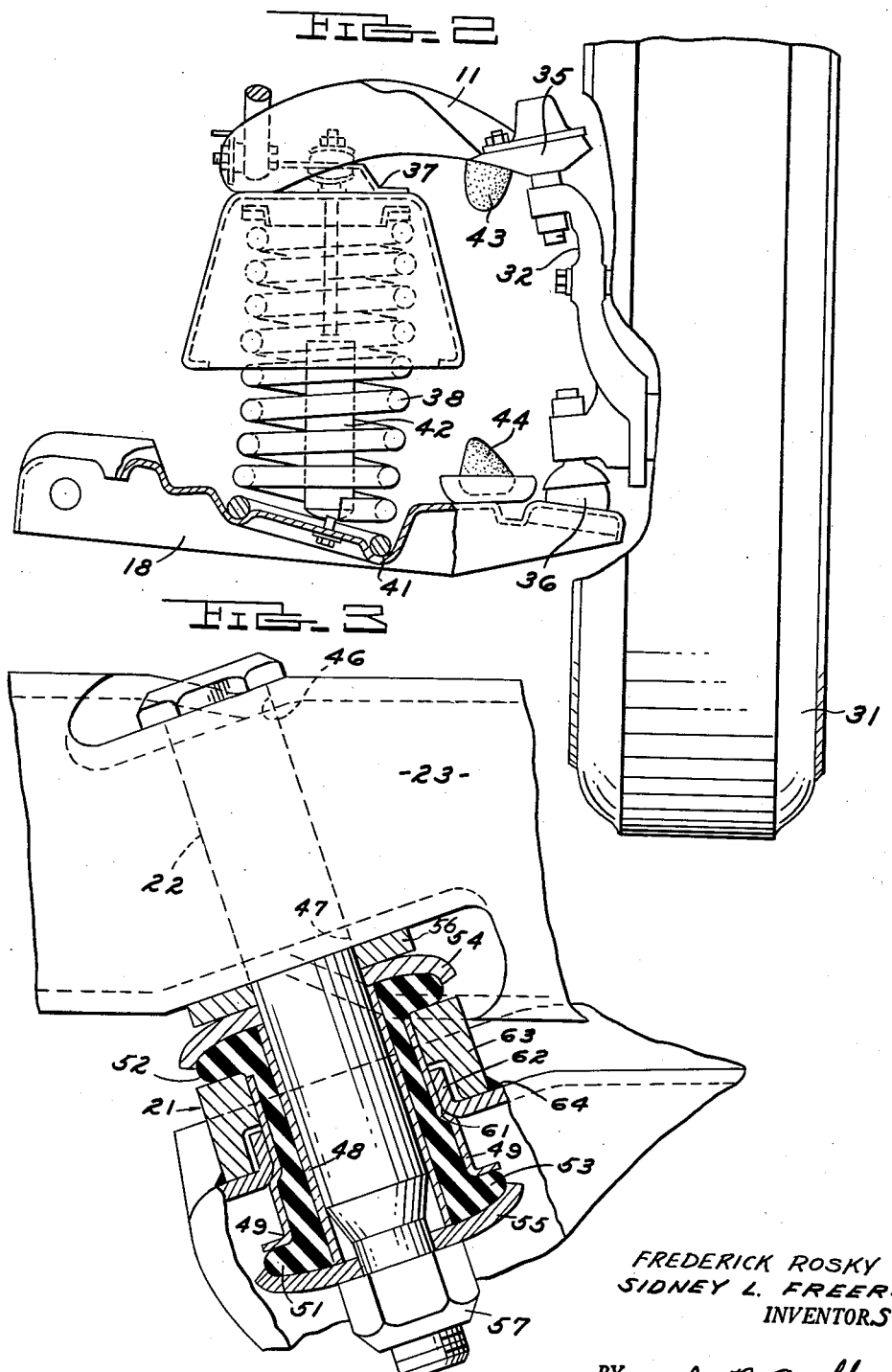

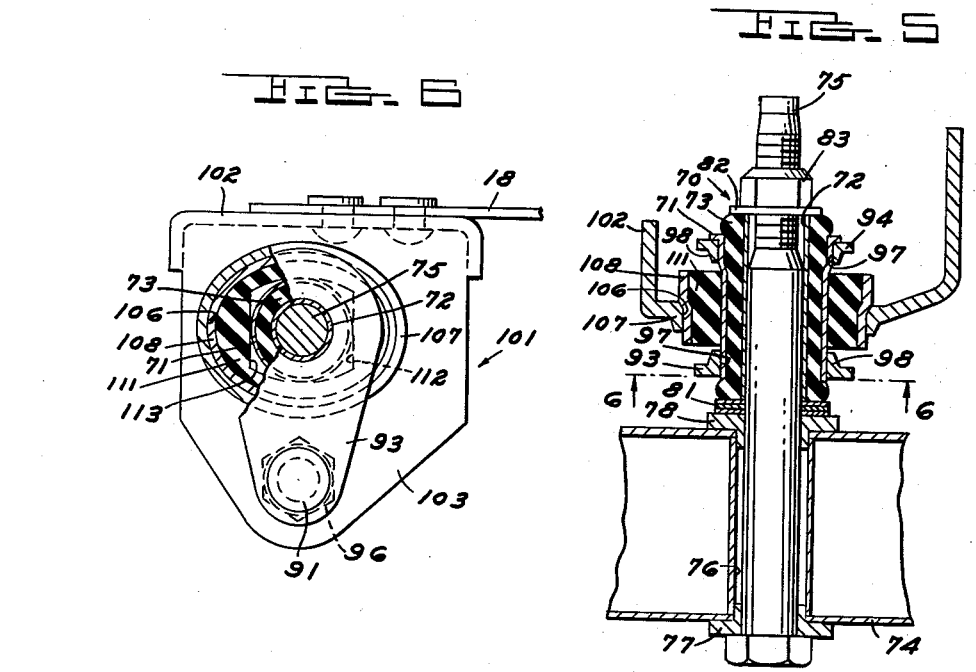
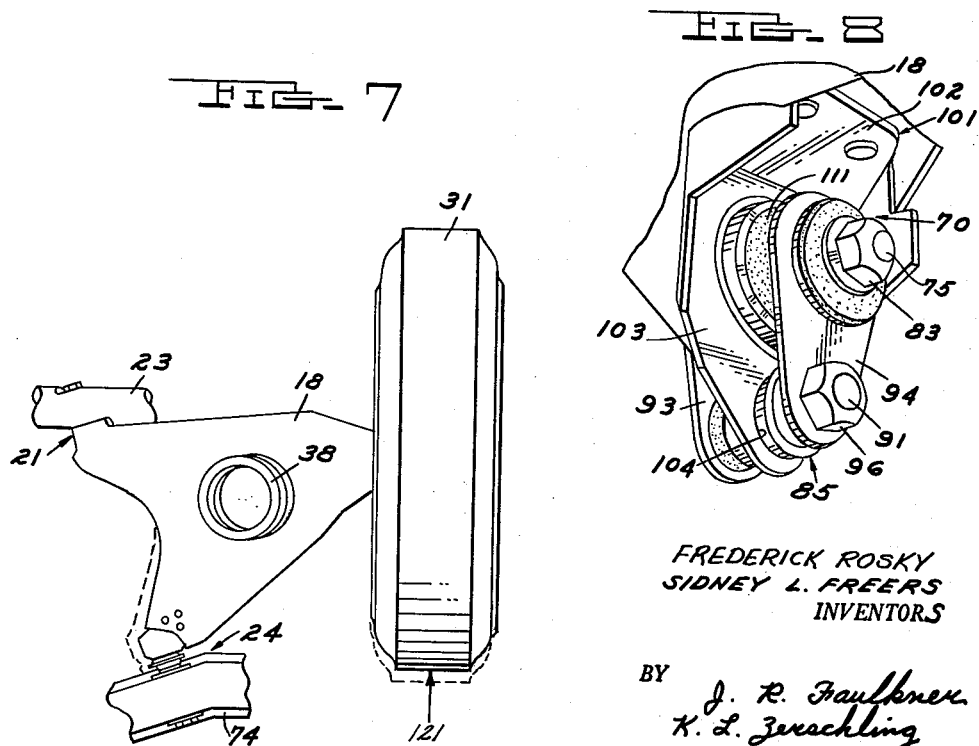

3,075,786
VEHICLE INDEPENDENT SUSPENSION SYSTEM
Sidney L. Freers and Frederick Rosky, Dearborn, Mich., assignors to Ford Motor Company, Dearborn, Mich., a corporation of Delaware
Filed Oct. 3, 1960, Ser. No. 59,920
7 Claims. (Cl. 280—96.2)

This invention relates to an independent suspension system for an automotive vehicle and more particularly to an independent suspension system for an automotive vehicle that eliminates harshness by permitting wheel recession against the force of spring means employed to spring a portion of the weight of the vehicle.

In conventional automotive vehicles, spring means are provided between the frame of the vehicle and the road wheels in order to absorb vertical movement of the road wheels and to prevent these movements from being transferred to the passengers of the vehicle. These spring means, however, function to absorb bumps and shocks applied to the wheels in a vertical direction only and do not function, nor are they constructed, to prevent the transfer to the vehicle passengers of horizontal loads and shocks applied to the road wheels. The term harshness is applied by those skilled in the art to the shocks and vibrations transmitted directly from the road wheels to the frame and body of the vehicle by horizontal loads and shocks.

This harshness may be substantially reduced by permitting a limited amount of wheel recession when the wheel encounters an object that transmits a horizontal force to the wheel. An example of this type of object is a tar strip between concrete slabs in a paved roadway or tar strips employed to repair cracks in a concrete roadway.

In certain known prior art devices, wheel recession is permitted by providing a vertical pin about which the wheel may pivot and by providing rubber buffers that resist the recession of the wheel and return the wheel to its normal position when the horizontal force is removed. Other prior art devices that permit wheel recession rely upon the compression and expansion of rubber bushings that connect the suspension arms to the frame of the vehicle. These devices, while permitting wheel recession, suffer from the disadvantage that steering control may be adversely affected by the low spring rate of the rubber employed, particularly when deterioration sets in because of wear and age. The present invention eliminates these disadvantages and provides a suspension system for an automotive vehicle in which wheel recession is permitted against the force of spring means that spring the weight of the vehicle.

This invention is an improvement over the independent suspension system described and claimed in copending application S.N. 59,979, filed Oct. 3, 1960, in the names of Frederick Rosky and Carl P. Wenzel and assigned to the assignee of this invention. In the present invention a resilient bushing assembly is employed to pivotally mount a suspension arm to a support member of an automotive vehicle, for example, a cross member of a frame, at one location on the suspension arm. At another location on the suspension arm, preferably forward of the first location and of the road wheel supported by the suspension arm, a tension shackle is employed to pivotally mount the suspension arm to a support member of the automotive vehicle, preferably another cross member of the frame. This tension shackle comprises another resilient bushing assembly that has an inner member affixed to the support member or frame and that is aligned with the first mentioned resilient bushing assembly. A third resilient bushing assembly having an inner member affixed to a bolt is suspended from said second mentioned resilient bushing assembly by means engaging the bolt and the outer member of the second mentioned resilient bushing assembly. The suspension arm has depending means affixed to the outer member of this third resilient bushing assembly. This means preferably comprises a depending plate having an enlarged aperture for receiving the second mentioned bushing assembly. Resilient material, such as synthetic rubber, is provided between the plate and the outer member of the second mentioned resilient bushing assembly.

During jounce and rebound of the road wheel supported by the suspension arm, the suspension arm may pivot about the first and second aligned resilient bushing assemblies. When longitudinal horizontal forces are applied to the road wheel the tension shackle permits that portion of the suspension arm positioned adjacent thereto to move transversely of the vehicle toward the road wheel and simultaneously to pivot upwardly against the force of the spring means employed to spring a portion of the weight of the vehicle from the road wheel. The transverse movement occurs about the first mentioned resilient bushing assembly. When the horizontal force is removed from the wheel the weight of the vehicle applied through the spring means returns the wheel to its normal position.

The conventional automotive vehicle employs the first two resilient bushing assemblies described above to permit pivotal movement of the suspension arm during jounce and rebound. In this invention only the extra resilient bushing assembly and means for supporting this bushing assembly need be provided in addition to the structure employed in conventional suspension systems. Thus the present invention provides an effective and inexpensive means for eliminating harshness by means of wheel recession, with only a minimum amount of modification of conventional suspension systems being required.

An object of the present invention is the provision of means for reducing harshness in an automotive vehicle.

A further object of the invention is the provision of a means for permitting recession of a road wheel of an automotive vehicle.

Another object of the invention is the provision of a means for permitting recession of a road wheel of an automotive vehicle against the force of spring means employed to spring the weight of the vehicle.

Still another object of the invention is the provision of a suspension system for an automotive vehicle that reduces harshness by permitting wheel recession against the force of spring means employed to spring the weight of the vehicle.

A further object of the invention is the provision of a suspension system for an automotive vehicle that reduces harshness through an inexpensive and effective means that entails a minimum of modification of conventional suspension systems.

Other objects and attendant advantages of the present invention will become more readily apparent as the specification is considered in connection with the attached drawings in which:

FIG. 1 is a plan view of the suspension system of the present invention;

FIG. 2 is a sectional view partially in elevation of the suspension system shown in FIG. 1;

FIG. 3 is an enlarged sectional view partially in elevation of a pivotal connection, at one location, of the lower suspension arm to a support member or frame;

FIG. 4 is an enlarged sectional view taken along the lines 4—4 of FIG. 1;

FIG. 5 is a sectional view taken along the lines 5—5 of FIG. 4;

FIG. 6 is a view partially in section taken along the lines 6—6 of FIG. 5;

FIG. 7 is a schematic view illustrating how wheel recession occurs in the present invention, and, FIG. 8 is a perspective view of the shackle arrangement of the present invention.

Referring now to the drawings in which like reference numerals designate like parts throughout the several views thereof, there is shown in FIGS. 1 and 2 an independent suspension system for a road wheel of an automotive vehicle with which the present invention may readily be employed.

This suspension system comprises an upper suspension arm 11 pivotally mounted on a shaft 12 at a pair of spaced locations by means of bushing assemblies generally designated by the numerals 13 and 14. The shaft 12 is arranged generally parallel to the center line of the automotive vehicle to which it is mounted and is attached to a longitudinal parallel extending frame member 15 by a pair of nut and bolt assemblies 16 and 17.

The lower suspension arm 18 is also pivotally mounted at a pair of spaced locations to support or frame members of the automotive vehicle. This is accomplished by a conventional resilient bushing assembly generally designated by the numeral 21 which includes a bolt member 22 that passes through apertures in a frame cross member 23, as will be described in greater detail subsequently.

The lower suspension arm 18 is also pivotally supported by means of another pivotal mechanism generally designated by the numeral 24 that is spaced from the resilient bushing assembly 21 and is located along the axis of this bushing assembly. A road wheel 31 is rotatably supported on a wheel support member 32 that includes spindle 33. The wheel support member 32 is connected to the upper suspension arm 11 by means of a universal type connector 35 which may take the form of a conventional ball joint. The wheel support member 32 is also connected to the lower suspension arm 18 by another universal type connector 36 which may also take the form of a conventional ball joint.

A spring means is positioned between the lower suspension arm 18 and a support or structural member of the automotive vehicle, preferably a portion of the frame, as shown at 37. This spring means may take the form of a helical spring 38 that has one end positioned in an annular depression 41 in the lower suspension arm. The other end of the helical spring 38 engages the frame member 37. A conventional shock absorber 42 may be positioned between the lower suspension arm 18 and the frame member 37 in accordance with conventional suspension system practice. The upper and lower suspension arms may also be provided with a pair of rubber stop members 43 and 44 which limit the movement of the upper and lower suspension arms during jounce and rebound by coming into engagement with a portion of the frame member 37.

The independent suspension system for a road wheel as described above provides for the vertical movement of the wheel caused by vertical forces that are brought about by bumps and depressions in a roadway. The spring member 38 in conjunction with the upper and lower suspension arms prevents the transfer of the vertical movement of the wheel to the frame and body of the vehicle. The present invention also provides for the recession of the wheel 31 against the force of spring member 38 when horizontal forces are applied to the wheel by irregularities in the roadway. The recession of the wheel substantially reduces the transfer of horizontal loads and shocks to the body of the vehicle thereby substantially reducing harshness, as previously explained.

The mechanism for accomplishing wheel recession against the force of the spring means is shown in deail in FIGS. 3 through 7. This mechanism is coupled to the support member or frame of the vehicle and to the lower suspension arm 18, and it permits the recession of the wheel 31 against the bias or force of the spring member 38. Referring now to FIG. 3 which discloses the resilient bushing assembly 21 in detail, it can be seen that the suspension arm 18 is pivotally supported from the frame or support member 23 through the bushing assembly 21. The frame member 23 is provided with a pair of aligned apertures shown by the dotted lines in outline form. The bolt member 22 passes through these aligned apertures and receives the resilient bushing assembly 21.

The resilient bushing assembly 21 includes an inner metallic sleeve 48 that fits over the bolt 22, an outer metallic sleeve 49 and an intermediate resilient member 51 which may be constructed of a suitable elastomer, such as synthetic rubber. This intermediate member 51 is bonded to both inner sleeve 48 and outer sleeve 49. The intermediate resilient member 51 is provided with enlarged end portions 52 and 53 and caps 54 and 55 are positioned over the bolt 22 in engagement with enlarged end portions 52 and 53 respectively. A washer 56 is positioned over the bolt between the cap 54 and the support or frame member 23. A nut 57 is provided to engage the end of bolt 22 and when this nut is tightened it compresses the inner sleeve member 48 between the caps 54 and 55 to prevent relative rotation between this inner sleeve and the bolt 22.

The suspension arm 18 is provided with an aperture 61 and an axial flange 62 positioned about the periphery of the aperture. A ring member 63 is welded to the control arm as shown at 64, and both the ring member 63 and the flange 62 are suitably affixed, for example, by press fitting or welding, to the outer sleeve member 49.

FIGS. 4 through 7 show the pivotal connection 24 between a support or frame member and another portion of the lower control arm 18 that is preferably spaced in a direction toward the front of the vehicle with respect to the resilient bushing assembly 21 and the other structure shown in FIG. 3. This pivotal connection 24 preferably takes the form of a tension shackle and includes a resilient bushing assembly 70 similar to the resilient bushing assembly 21 shown in FIG. 3. This resilient bushing assembly includes an outer metallic sleeve 71, an inner metallic sleeve 72, and an intermediate resilient member 73 constructed of a suitable elastomer, for example, synthetic rubber. The intermediate resilient member 73 is bonded to both the outer metallic sleeve 71 and the inner metallic sleeve 72.

The resilient bushing assembly 70 is mounted on a support member of the automotive vehicle, for example, a cross member 74 of the frame. This is accomplished by means of a bolt member 75 that extends through a cylindrical opening 76 in the frame member 74 and that engages the frame through sleeve members 77 and 78. The inner metallic sleeve 72 of the bushing assembly is positioned over the bolt 75 and is secured thereto by being compressed between washers 81 and 82 through the force of nut 83. This prevents relative rotation between the bolt 75 and the inner sleeve member 72. It will be apparent from an inspection of FIG. 4 that the nut 83 also secures the bolt 75 to the support or frame member 74 through the sleeve members 77 and 78.

Another resilient bushing assembly, generally designated by the numeral 85, is positioned below the resilient bushing assembly 70 and the bolt 75. This resilient bushing assembly comprises an outer sleeve 86, an inner sleeve 87, and an intermediate resilient member 88 that is constructed of a suitable elastomer, for example, synthetic rubber. A bolt 91 extends through the inner metallic sleeve 87 and means are provided for suspending the resilient bushing assembly 85, through the bolt 91, from the resilient bushing assembly 70. This means preferably takes the form of a pair of plates or links 93 and 94 each having an aperture 95 positioned in the lower end thereof for receiving the bolt 91. The resilient bushing assembly 85 is positioned on the bolt member 91 between these two plates or links and a nut 96 is provided to compress the inner sleeve 87 between the two plates or links thereby nonrotatably securing it to the bolt 91. Each of the links or plates 93 and 94 is also provided with an aperture 97 positioned in the upper end thereof for receiving the outer sleeve 71 of the resilient bushing assembly 70. A flange 98 is provided about each of these apertures and each of these flanges is suitably affixed to the outer sleeve member 71, for example, by welding.

The control arm 18 is provided with a structural member 101 that is affixed to the resilient bushing assembly 85. This structural member preferably is angular in form and has an upper portion 102 that is riveted, as shown in FIGS. 1 and 6, or otherwise suitably affixed to the suspension arm 18. A second depending portion 103 of this structural member extends at substantially right angles to the upper portion 102 in a plane parallel to the planes of the plates or links 93 and 94. As can best be seen by reference to FIGS. 4 and 8, the depending portion 103 of the structural member 101 is positioned between the plates or links 93 and 94 and has an aperture 104 positioned in the lower end thereof for receiving the outer sleeve member 86 of the resilient bushing assembly 85. A flange 105 is provided about this aperture and this flange is affixed to the outer sleeve member 86 by any suitable means, for example, by press fitting or welding.

The upper end of the depending portion 103 of the structural member 101 is provided with an enlarged aperture 106 that has a peripheral dimension considerably in excess of the outer peripheral dimension of the outer sleeve member 71 included in resilient bushing assembly 70. As can be seen by reference to FIG. 6, this aperture is generally oval in configuration and a flange 107 is positioned about the periphery of the aperture. A resilient bushing having an outer sleeve 108 and an inner member 111 constructed of a suitable elastomer such as synthetic rubber, is positioned within the aperture 106, and the outer sleeve 108 is affixed to the flange 107 by any suitable means, for example, by welding. The inner member 111 is bonded to the outer sleeve 108 and has straight side portions 112 and 113 that engage the outer sleeve 71 of the resilient bushing assembly 70.

Although the inner resilient member 111 is shown in one piece and as generally oval in configuration, it may also be formed of two pieces which may be positioned at the enlarged portion of the oval shaped aperture 106 as will be apparent when the function of this bushing is discussed subsequently.

The axes of the bolt 75 and the bushing assembly 70 are positioned in alignment with the axes of the resilient bushing assembly 21 and the bolt 22, and as can best be seen by reference to FIG. 4, the bushing assembly 85 and the bolt 91 are positioned below the bushing assembly 70 and the bolt 75 and have axes which are parallel to the axes of the bushing 70 and the bolt 75. It can be appreciated that a portion of the suspension arm 18 is supported from the support member 74, preferably a cross member of the frame, through the bolt 75, the resilient bushing assembly 70, the plates or links 93 and 94, the bolt 91, and the structural member 101 that has the depending portion 103 affixed to the outer sleeve member 86 to the bushing 85 and that has the upper portion 102 affixed to the suspension arm 18.

During normal jounce and rebound of the road wheel 31 the suspension arm 18 may pivot about the aligned axes of the resilient bushing assembly 70 and the resilient bushing assembly 21. This pivotal movement takes place through the torsional deformation of the intermediate resilient members 51 and 73 of these bushing assemblies. During the vertical movements of the wheel 31, the portion of the suspension arm 18 affixed to the bushing assembly 85 pivots this bushing assembly about the bolt 75 by means of the bolt 91, the links or plates 93 and 94 and the torsional deformation of the intermediate member 73 of the bushing assembly 70.

When the wheel member 31 encounters a horizontal force the shackle mechanism described permits the portion of the suspension arm affixed to the plate member 101 to move transversely outwardly toward the wheel 31 and upwardly against the force of the spring member 38. This upward and outward movement of this portion of the suspension arm is a pivotal movement about the resilient bushing assembly 21 and also about the axis of the bolt 75. The movement about the resilient bushing assembly 21 is permitted by the deformation of intermediate resilient member 51. During this movement the lower resilient bushing assembly 85 and the bolt 91 swing upwardly about the bolt 75 against the force of the spring member 38. This upward and outward movement of this portion of the control arm permits a limited amount of wheel recession relative to the support members 74 and 23 as can best be seen by reference to the schematic drawing of FIG. 7. In this view, the solid lines show the position of the wheel in its recessed position brought about by a horizontal force represented by the arrow 121. When the horizontal force is removed from the wheel the force of the spring means 38 applied by the weight of the vehicle returns the wheel to the normal position shown in the dotted lines in FIG. 7.

The resilient bushing 111 is employed to resiliently limit the outward transverse movement of the portion of the suspension arm positioned adjacent thereto and consequently serves to resiliently limit the wheel recession. This limiting action occurs when the outer sleeve member 71 of the bushing assembly 70 compresses the portion of the resilient bushing 111 located adjacent either the straight side 112 or 113. It can be seen that the bushing 111 also serves to damp any oscillations of the suspension arm that may tend to occur. This limiting action and the damping of oscillations assists in providing stability for the wheel 31 and is particularly important during braking operations.

Although this invention has been described in relation to a vehicle having a spring means connected to a lower suspension arm, it is equally applicable to suspension systems having a spring means connected to an upper suspension arm. In this case the resilient bushings and shackle members described in the various embodiments of the invention would be employed to couple the upper suspension arm to the support members of the vehicle. It will be understood that the invention may be employed with any suitable spring means, for example, torsion bars and leaf springs as well as the helical spring illustrated in FIG. 2.

The invention has been described in relation to an automotive vehicle having a separate frame structure, however, it is not intended to be limited to an automotive vehicle having such a structure. It can be suitably employed with vehicles having unitized bodies or with tractor-like vehicles in which the body is mounted directly upon the engine and driveline components. The term "frame" when used in the specification and claims is meant to include any structural member of any automotive vehicle to which a suspension system may be coupled.

It can be appreciated that the present invention provides a simple and inexpensive means for reducing harshness in an automotive vehicle by permitting wheel recession. This means can be placed in a conventional suspension system with a minimum amount of modification and hence provides a suspension system for permitting wheel recession that can economically be employed in production.

It will be understood that the invention is not to be limited to the exact construction shown and described, and that various changes and modifications may be made without departing from the spirit and scope of the invention as defined in the appended claims.

We claim:

1. In an automotive vericle the combination comprising, a road wheel, a support member, a suspension arm, means for rotatably supporting said road wheel from said suspension arm, spring means positioned between said support member and said suspension arm, a first resilient bushing assembly pivotally connecting said suspension arm to said support member at one location on said suspension arm, a second resilient bushing assembly connected to said support member adjacent another location on said suspension arm spaced from said first location, said first and said second resilient bushing assemblies being in axial alignment, and means connected to said second resilient bushing assembly and said suspension arm for pivotally supporting said suspension arm from said second resilient bushing assembly, said suspension arm being connected to said means at a point below said second resilient bushing assembly.

2. In an automotive vehicle the combination comprising, a road wheel, a support member, a suspension arm, means for rotatably supporting said road wheel from said suspension arm, spring means positioned between said support member and said suspension arm, a first resilient bushing assembly pivotally connecting said suspension arm to said support member at one location on said suspension arm, a second resilient bushing assembly connected to said support member adjacent another location on said suspension arm spaced from said first location, said first and said second resilient bushing assemblies being positioned in axial alignment, a third resilient bushing assembly positioned below said second resilient bushing assembly and having its axis arranged parallel to the axis of said second resilient bushing assembly, means for connecting said third resilient bushing assembly to said suspension arm, and means connected to said second and said third bushing assemblies for pivotally supporting said third resilient bushing assembly from said second resilient bushing assembly.

3. In an automotive vehicle the combination comprising, a road wheel, a support member, a suspension arm, means for rotatably supporting said road wheel from said suspension arm, spring means positioned between said support member and said suspension arm, a first resilient bushing assembly pivotally connecting said suspension arm to said support member at one location on said suspension arm, a second resilient bushing assembly connected to said support member adjacent another location on said suspension arm spaced from said first location, said first and said second resilient bushing assemblies being positioned in axial alignment, a third resilient bushing assembly positioned below said second resilient bushing assembly and having an axis arranged parallel to the axis of said second resilient bushing assembly, said second and said third resilient bushing assemblies each having an outer sleeve, an inner sleeve, and an intermediate resilient member constructed of an elastomer bonded to said outer and inner sleeves, means connected to the outer sleeve of said second resilient bushing assembly and to the inner sleeve of said third resilient bushing assembly for pivotally supporting said third resilient bushing assembly from said second resilient bushing assembly a depending structural member affixed to said suspension arm, said depending structural member having an aperture positioned therein of larger peripheral dimension than the peripheral dimension of the outer sleeve of said second resilient bushing assembly, said second resilient bushing assembly being positioned within said aperture, said depending structural member being affixed to the outer sleeve member of said third resilient bushing assembly.

4. The combination of claim 3 in which a resilient bushing is positioned in the aperture in said depending structural member adjacent to the outer sleeve of said second resilient bushing assembly.

5. A suspension system for an automotive vehicle comprising, a road wheel, a support member, a suspension arm, means for rotatably supporting said road wheel from said suspension arm, spring means coupling said suspension arm to said support member, resilient means positioned between said support member and said suspension arm at one location on said suspension arm for pivotally mounting said suspension arm to said support member, a tension shackle positioned at another location on said suspension arm for mounting said suspension arm to said support member, said tension shackle comprising a first bolt affixed to said support member, a resilient bushing assembly having an inner sleeve, an outer sleeve and an intermediate resilient member constructed of an elastomer bonded to said inner and outer sleeves, said inner sleeve being positioned over and secured to said bolt, said bolt and said resilient bushing assembly being aligned with said resilient means, a second bolt positioned in parallel relationship below said first bolt, a second resilient bushing assembly having an inner sleeve, an outer sleeve, and an intermediate resilient member constructed of an elastomer bonded to said inner and outer sleeves, said last mentioned inner sleeve being positioned over and secured to said second bolt, said last mentioned outer sleeve being connected to a portion of said suspension arm, and means positioned in engagement with said second bolt and the outer sleeve of said first mentioned resilient bushing assembly for pivotally supporting said second bolt, said second mentioned resilient bushing assembly and said portion of said suspension arm from said first mentioned bolt and said support member.

6. A suspension system for an automotive vehicle comprising, a road wheel, a support member, a suspension arm, means for rotatably supporting said road wheel from said suspension arm, spring means coupling said suspension arm to said support member, a pivot device carried by said support member, a resilient bushing mechanism including an inner sleeve, an outer sleeve and an intermediate member constructed of an elastomer bonded to said inner and outer sleeves, said inner sleeve being positioned over and secured to said device, said suspension arm being affixed to said outer sleeve, a tension shackle positioned at a spaced location from said resilient bushing mechanism for pivotally mounting said suspension arm to said support member, said tension shackle comprising a first bolt affixed to said support member, a first resilient bushing assembly having an inner sleeve, an outer sleeve and an intermediate member constructed of an elastomer bonded to said inner and outer sleeves, said last mentioned inner sleeve being positioned over and secured to said bolt, said bolt and said resilient bushing assembly being aligned with said pivot device and resilient bushing assembly, a second bolt positioned in parallel relationship below said first bolt of said tension shackle, a second resilient bushing assembly having an inner sleeve, an outer sleeve, and an intermediate resilient member constructed of an elastomer bonded to said inner and outer sleeves, said just mentioned inner sleeve being positioned over and secured to said second bolt, said just mentioned outer sleeve being connected to a portion of said suspension arm, and means positioned in engagement with said second bolt and the outer sleeve of said first resilient bushing assembly of said tension shackle for pivotally supporting said second bolt, said second resilient bushing assembly of said tension shackle and said portion of said suspension arm from said first bolt and said support member of said tension shackle.

7. A suspension system for an automotive vehicle that eliminates harshness by permitting recession of a road wheel comprising, a support member, suspension means coupled to said road wheel, spring means coupled to said suspension means and said support member, and means coupled to said support member for permitting wheel recession against the force of said spring means, said means comprising a pivotal connection between said suspension means and said support member at one location on said suspension means, a tension shackle coupling said suspension means to said support member at a location forward in the automotive vehicle of the first mentioned location, said tension shackle comprising a first resilient bushing assembly connected to said support member, a second resilient bushing assembly connected to said suspension means and means connecting said first resilient bushing assembly and said second resilient bushing assembly for suporting said second resilient bushing assembly and the portion of the suspension means connected thereto from said first resilient bushing assembly said pivotal connection and said first resilient bushing assembly being in axial alignment and providing means for said suspension means to traverse a jounce and rebound path relative to said support member.

References Cited in the file of this patent
UNITED STATES PATENTS

| | | |
|---|---|---|
| 2,320,552 | Balz et al. | June 1, 1942 |
| 2,372,744 | Sherman | Apr. 3, 1945 |
| 2,827,303 | Herbenar | Mar. 18, 1958 |